United States Patent [19]

Cobbs, Jr.

[11] Patent Number: 4,560,594

[45] Date of Patent: Dec. 24, 1985

[54] METHOD FOR FORMING ADHESIVE BOND AND A LIQUID CRYSTAL ADHESIVE

[75] Inventor: Walter H. Cobbs, Jr., Amherst, Ohio

[73] Assignee: Nordson Corporation, Amherst, Ohio

[21] Appl. No.: 357,691

[22] Filed: Mar. 12, 1982

[51] Int. Cl.[4] .......................... C09K 3/34; B32B 3/00; B32B 27/14; B05D 5/00

[52] U.S. Cl. ......................................... 428/1; 427/286; 428/195; 528/195; 528/302

[58] Field of Search ............... 428/1, 195; 528/195, 528/302; 427/286

[56] References Cited

U.S. PATENT DOCUMENTS

| | | | |
|---|---|---|---|
| 3,558,557 | 1/1971 | Hrach et al. | 528/195 |
| 3,778,410 | 12/1973 | Kuhfuss et al. | |
| 3,804,805 | 4/1974 | Kuhfuss et al. | |
| 3,826,224 | 7/1974 | Baker et al. | 118/685 |
| 4,156,774 | 5/1979 | Buxbaum et al. | 528/302 X |
| 4,232,951 | 11/1980 | Aharoni et al. | |

OTHER PUBLICATIONS

D. G. Baird and G. L. Wilkes, "Thermotropic Liquid Crystalline Copolyesters", pp. 357-358.
E. Joseph, G. L. Wilkes and D. G. Baird, "Morpholigical Studies . . . Benzoic Acid", pp. 359-360.

Primary Examiner—Michael R. Lusignan
Attorney, Agent, or Firm—Wood, Herron & Evans

[57] ABSTRACT

A method of forming an adhesive bond comprising heating a thermoplastic, polymeric, thermotropic nematic liquid crystalline material until the material becomes fluid, and applying this material onto a substrate. Since the liquid crystalline material exhibits excellent tensile strength, the present method can be employed not only as an adhesive but also to strap articles and band a plurality of articles together.

6 Claims, 6 Drawing Figures

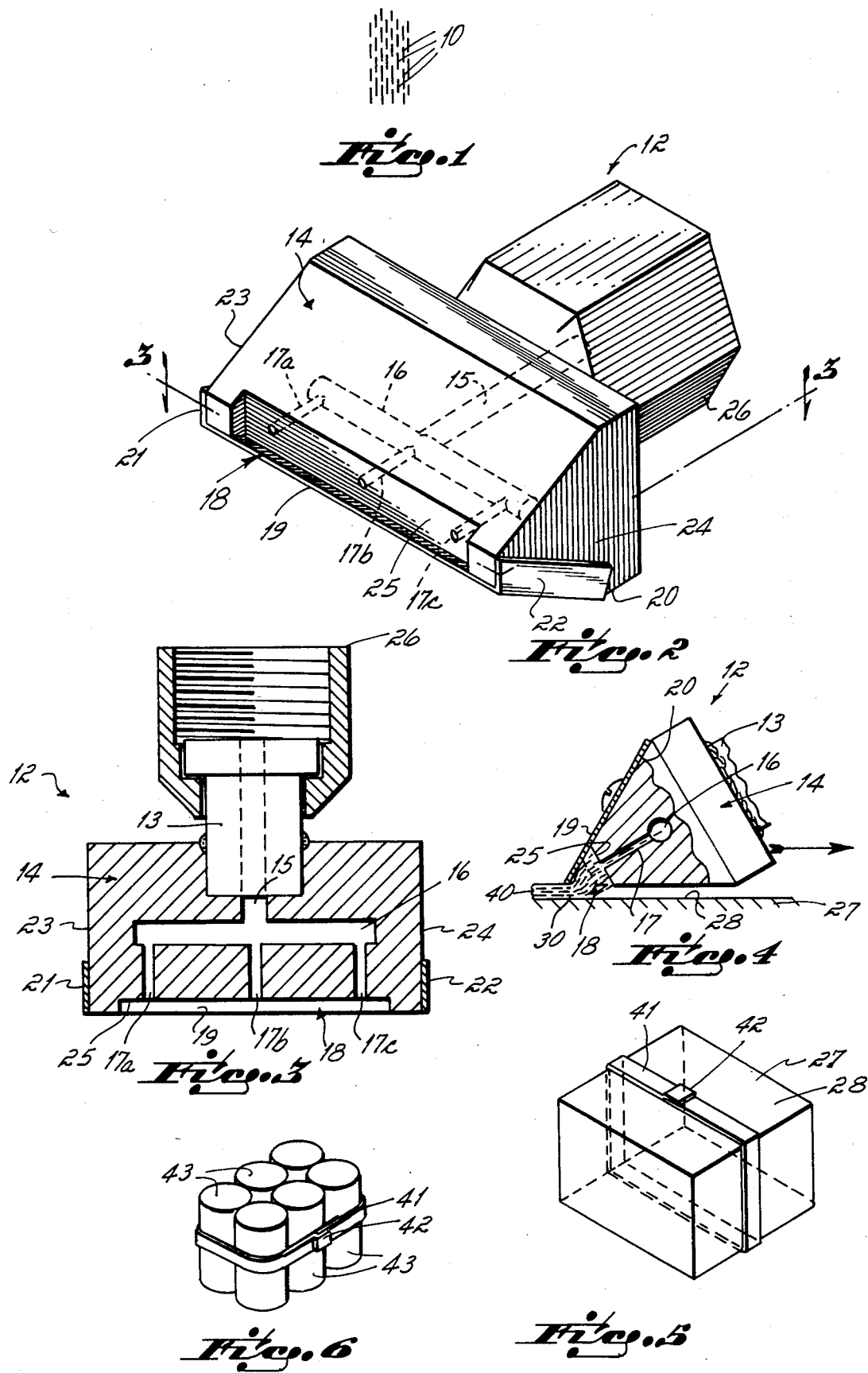

METHOD FOR FORMING ADHESIVE BOND AND A LIQUID CRYSTAL ADHESIVE

BACKGROUND OF THE INVENTION

Hot melt adhesives are well known, having been used for decades. Generally, these adhesives comprise thermoplastic materials which when heated melt and are capable of wetting a substrate. When cooled, these materials solidify and firmly adhere to the substrate. Compositions which have been used as hot melt adhesives include polyolefins, such as polyethylene and polypropylene, polyesters such as polyvinyl acetate and polyamides.

Each of these hot melt adhesives possess or exhibit particular characteristics which makes the use of one preferable over another in a particular application. One characteristic which is generally not exhibited by known hot melt adhesives is substantial tensile strength. As a rule, hot melt adhesives are incapable of adding structural support to an article to which they are bonded since they tend to pull apart easily. Furthermore, these hot melt adhesives are generally ineffective when used to bond a series of articles together by laying a strip of the hot melt adhesive around and onto the periphery of the articles as opposed to between the individual articles. Thus, they are basically incapable of bundling and strapping articles together.

A technology not normally related to adhesive bonding is thermotropic mesomorphism. Specifically, this refers to the production of a mesomorphic state in a material by means of heat. Mesomorphic state refers to a molecular state or organization of a composition which is neither a true liquid nor a true crystal. Compounds which enter this mesomorphic state are commonly referred to as liquid crystals.

Two of the types of liquid crystalline materials are nematic liquid crystalline material and smectic liquid crystalline material. A smectic liquid crystalline material can be forced to assume a stratified molecular structure, the molecules being arranged in layers with their axes approximately normal to the plane of the layers. This state does not improve the tensile strength of the smectic liquid crystalline material. A nematic liquid crystalline material can be forced to assume a structure where the molecules assume a parallel or nearly overlapping parallel orientation. The molecules, while in this nematic state, are thread-like or rod-like and can readily be forced or arranged into the parallel, overlapping structure.

The term thermotropic refers to the means by which the liquid crystalline material is forced into the mesomorphic state. A thermotropic liquid crystal is one which is caused to enter a mesomorphic state by heat. This is contrasted by a lyotropic liquid crystal which is caused to enter the mesomorphic state by solvation. For example, the Aramids TM, which are aromatic polyamide liquid crystals, are caused to go into the nematic state by the application of concentrated sulphuric acid.

Thus, a thermotropic nematic liquid crystalline substance is a substance which when heated, undergoes mesomorphism entering a nematic state. When cooled, the molecules of this material generally retain their organization and thus exhibit synergistic tensile strength.

SUMMARY

The present invention provides an improved hot melt adhesive and a method of forming a bond with this adhesive which adds structural strength and support to the articles to which the adhesive of the present invention is being applied. This invention is premised in part upon the discovery that known thermoplastic, polymeric thermotropic nematic liquid crystalline materials perform well as hot melt adhesives. These materials also exhibit exceptional tensile strength when solidified if they have been ordered while in the nematic state. Specifically, the present invention comprises the application of molten thermoplastic polymeric thermotropic nematic liquid crystalline material onto an article or substrate, which upon cooling bonds to the article or substrate. In a preferred embodiment the invention comprises applying a continuous loop or strap of material around and onto one or more articles, thereby strapping the article or articles.

The adhesive of the present invention exhibits a tensile strength vastly superior to that generally exhibited by hot melt adhesives and an ability to wet the surface of an article and form a strong bond upon cooling. The adhesive of the present invention enables one to form a bond which adds structural strength to the article. Furthermore, this structural support is directional, enabling one to provide structural support in one direction and not in another. Accordingly, the present invention is useful in providing reinforcement or structural support to articles, as well as in bundling and strapping operations.

FIGURES

FIG. 1 is a schematic depiction of a liquid crystalline material in the nematic state.

FIG. 2 is a perspective view of a nozzle for use in the present invention;

FIG. 3 is a cross section of the nozzle of FIG. 2 taken at line 3—3 of FIG. 2;

FIG. 4 is an elevational view of the nozzle shown in FIG. 1 partially broken away and in use according to a method of the present invention;

FIG. 5 is a perspective view of a box strapped according to the method of the present invention;

FIG. 6 is a plurality of cylindrical cans strapped together according to the method of the present invention;

DETAILED DESCRIPTION

An adhesive bond is formed using a hot melt adhesive consisting of a thermoplastic polymeric, thermotropic, nematic, liquid crystalline material. Thermotropic nematic liquid crystalline material is material which can be caused to enter a nematic state by an increase in temperature. A schematic depiction of a material in a nematic state is shown in FIG. 1. Line 10 represents the rod-like molecules of a nematic liquid crystalline material. As can be seen, these molecules assume an organized, parallel, overlapping structure. In a nematic state, these rod-like molecules are not true liquids. The individual molecules, although free to rotate, are rigid. When an orienting force is applied, they tend to assume the parallel overlapping structure depicted in FIG. 1. A further increase in temperature brings the material into a true liquid state and a decrease in temperature brings the material back into a crystalline state.

The temperature at which the material undergoes the transformation from the true crystalline state to the nematic state is referred to as the crystal-nematic point (C-N point) and the temperature at which the nematic material transforms to the liquid state is referred to as the nematic-liquid point (N-L point).

The compositions useful in the present invention are those mesomorphic substances which are thermoplastic, polymeric, and thermotropic. One particular material useful as an adhesive in the present invention is disclosed in U.S. Pat. No. 3,804,805 which is incorporated herein by reference. This patent discloses the preparation of a thermotropic liquid crystalline polymeric thermoplastic material using copolymers based on polyethylene terephthalate and parahydroxybenzoic acid. This is further described in J. Poly. Sci., Polym. Chem. Ed. 2043 (1976). The copolyester described is one which has no substantial amount of aliphatic to aromatic oxygen linkages, the copolyester being comprised of the following di-valent radicals:

$$-\overset{O}{\underset{\|}{C}}-R_1-\overset{O}{\underset{\|}{C}}- \quad (A)$$

$$-O-CH_2-CH_2-O- \quad (B)$$

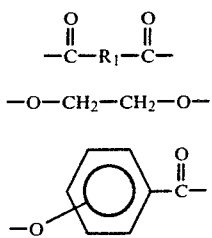  (C)

wherein $R_1$ is a divalent, aromatic radical having 6 to 16 carbon atoms, a divalent aliphatic radical having 1 to 40 carbon atoms, or a divalent aromatic radical having 6 to 16 carbon atoms with the carbonyl linkages separated by at least 3 carbon atoms, with the proviso that at least 50 mole percent of $R_1$ is the divalent aromatic radical;

wherein the range of radical (C) is from 20 to 80 mole percent based on the total moles of radical (A) and (C) combined and at least 60 mole percent of radical (C) is the para isomer.

Preferably $R_1$ is the divalent aromatic radical having 6 to 16 carbon atoms with the carbonyl linkages separated at by at least 3 carbon atoms and at least 90 mole percent of radical (C) is the para isomer and the range of radical (C) is 30 to 70 mole percent based on the total moles of (A) and (C) combined.

The copolyesters are formed by fragmenting a polyester by acidolysis of a starting polyester with an acyloxybenzoic acid. The inherent viscosity of the fragmented polyester is then increased to form the copolyester for use in the present invention.

The starting polyester is formed from a di-carboxylic acid and ethylene glycol and contains repeating units of radical (A) attached to radical (B). When the acyloxybenzoic acid and starting polyester are contacted, acidolysis occurs and a fragmented polyester is formed. The inherent viscosity of the fragmented polyester is then increased to form the copolyester for use in the invention comprised from radical (A), (B) and (C).

Radical (A) of the copolyester is contributed from the di-carboxylic acid portion of the starting polyester, radical (B) of the copolyester is contributed from the ethylene glycol portion of the polyester and the acyloxybenzoic acid contributes radical (C) to the copolyester. Radical (C) will be recognized as a radical remaining after removal of the alkyl and hydroxy groups from the acyloxybenzoic acid.

A polyester useful in the present invention comprises one formed from polyethylene terephthalate and an acyloxybenzoic acid such as parahydroxybenzoic acid. The formed polymer used in the present invention exhibited or contained 20 mole percent ethylene dioxy units, 20 mole percent terephthaloyl units and 60 mole percent p-oxybenzoyl units.

The adhesive material of the present invention is applied to a substrate by heating the material at least to the C-N point of the material and if the material is not flowable at this point or it does not exhibit wetting ability at this point to the N-L point of the material. Generally, the material should be heated to the N-L point to be fluid enough to wet the surface of the substrate. The material should not be heated to its boiling point or to its point of decomposition.

The material can be applied using any known hot melt adhesive applicator which is capable of heating the material up to its N-L point. Applicators suitable for use in the present invention is disclosed in U.S. Pat. Nos. 3,811,405, 3,815,878, 3,818,930 and 3,826,224. These are incorporated herein by reference.

The liquid crystal material adhesive once heated is applied onto a substrate while still fluid enough to wet the surface of a substrate. While applying the material to the substrate, the material should be subjected to an orienting force. An orienting force is a force which will cause the molecules to align themselves in parallel, overlapping fashion as depicted in FIG. 1. A nematic liquid crystal may align itself in this fashion with the application of just a slight force. This force can be physical such as the compression which occurs when the material flows through a nozzle or can be electromagnetic or vibrational. Preferably, the compression occurring as the material passes through a nozzle will be sufficient force.

Generally, a second substrate will be applied upon the dispensed material prior to the materials temperature lowering below its N-L or C-L point. The fluid material thus will wet both surfaces. Upon cooling below the N-L point, a bond forms between the two substrates.

It should be noted that if the temperature of the material is raised substantially above the N-L point, the tensile strength of the material may decrease. This is believed to be due to the movement of the individual molecules from the organized nematic arrangement to a random arrangement. The longer the material is in the liquid state after passing the organizing force, the more random the arrangement of molecules become. This reduction in tensile strength increases gradually as the temperature is increased.

One preferred use of the present invention is the strapping of articles. To strap an article, the adhesive material in a liquid or nematic state is extruded in a strip or band onto the article being strapped and around the periphery of the article in such a manner that the adhesive material, while still in a molten state, contacts the outer surface of the article. A box strapped according to this method is shown in FIG. 5.

In order to obtain a band of material, a slotted nozzle is used. Such a nozzle 12 is shown in FIGS. 2-4. This nozzle includes a nozzle stem 13 which is rigidly attached to the nozzle body 14. This nozzle body 14 has a generally triangular cross section. The nozzle includes an axial bore 15 which extends through the nozzle stem into the nozzle body and communicates with a transverse bore 16 extending through the horizontal axis of the nozzle body. This transverse bore in turn is in communication with a plurality of longitudinal bores 17a, 17b, and 17c which extend from the transverse bore 16 to an orifice 18 of the nozzle. Attached to the nozzle body is a plate 19 which extends substantially across an upper side 20 of the nozzle body and includes flanges 21 and 22 which extend downwardly along either side 23 and 24 of the nozzle body. This plate extends beyond the nozzle body and hangs over a slotted area 25 in the nozzle body. The slotted area 25, together with the plates 21, 22 define the orifice 18 of the nozzle.

The nozzle stem is attached to the orifice of a hot melt adhesive applicator (not shown) by means of a threaded retaining nut 26. Since various types of applicators can be used in the present invention, and these applicators form no part of the present invention, the adhesive applicator itself is not shown. However, suitable applicators have already been disclosed in the application.

As shown in FIG. 4, in order to strap an article 27 according to the method of the present invention, the nozzle, attached to a hot melt adhesive applicator, charged with the thermoplastic polymeric thermotropic nematic liquid crystalline material of the present invention, is placed in close proximity to the surface 28 to which the material is being applied and the molten hot melt adhesive 40 of the present invention is forced by the applicator through the slotted nozzle onto the substrate. The nozzle is moved relative to the article and a strip 41 of material is formed along the surface of the article. Forcing the hot melt adhesive 40 of the present invention, while in a molten state, through the nozzle causes the molecules (diagrammatically depicted as lines 30 in FIG. 4) to align themselves in a parallel, overlapping fashion. When the adhesive cools and solidifies, the molecules retain their orientation. This orientated molecular structure gives the adhesive extraordinary tensile strength.

As the article is being strapped by the adhesive material, the article is rotated so that a strip of this molten material is applied around the entire periphery of the article and back upon the strip itself, thereby forming a continuous strip or endless strip 41 of hot melt adhesive with a small area 42 of overlap. The adhesive will adhere to the surface and to itself, thereby forming a strapped article.

A plurality of articles 43 can be strapped together as shown in FIG. 6. The articles are held in contact with each other and are either rotated or the applicator is rotated as a strip of molten adhesive material is extruded from the applicator through the nozzle onto the periphery of the group of articles. As shown in FIG. 6, these articles could typically be a plurality of cans or bottles. When multiple articles are strapped, additional supporting means, such as a tray (not shown) may be desired to prevent relative movement of the strapped article.

The present invention is not limited to strapping of bottles, nor to the strapping of a single article. The method of the present invention may be further appreciated by reference to the following non-limiting example.

EXAMPLE

A thermoplastic polymeric thermotropic liquid crystalline material formed according to the method disclosed in U.S. Pat. No. 3,804,805, having the following makeup:
20 mole percent ethylene dioxy units
20 mole percent terephthaloyl units
60 mole percent p-oxybenzoyl units
was heated in a hot melt applicator to about 500° F. This heated material was extruded from the applicator through a slot nozzle of the type described above and onto the surface of a rectangular paperboard box. This strap of extruded material was applied onto the surface of the box completely around its periphery and back onto itself to form a continuous strip of material. The material upon solidification adhered to the surface of the box and remained continuous throughout the length of the strap. When the solidified adhesive was removed from the box, paper fibers were pulled with the adhesive.

When such a material is used as an adhesive, tensile strength is added to the articles to which this adhesive adheres. The tensile strength is directional in the direction of the extrusion, thus providing the added advantage of tensile strength in only one dimension. This enables one to tear the strip by applying a ripping force in a direction normal to the direction of the extrusion.

Thus, according to the method of the present invention, an adhesive bond can be formed which provides structural support to a bonded substrate. Furthermore, the method of the present invention enables one to form a bond which is strong enough to hold a plurality of articles together.

Thus, having described my invention, I claim:

1. A method of strapping one or more articles comprising heating a thermoplastic, polymeric, thermotropic, nematic liquid crystalline material at least to the C-N point of said polymeric material and applying a molten strip of said material onto the surface of said one or more articles completely around the periphery of said one or more articles to form a contnuous strip of material, applying an orienting force to said polymeric material while said material is still in a molten state.

2. The method as claimed in claim 1 wherein said article comprises a box.

3. The method as claimed in claim 1 wherein said article comprises a plurality of articles positioned in contact with each other.

4. A method as claimed in claim 1 wherein said thermoplastic, polymeric nematic liquid crystalline material comprises a copolyester having an inherent viscosity of at least 0.4 measured at 25° C. using 0.5 gram of polymer per 100 ml of a solvent compound of 60 volumes of phenol and 40 volumes of tetrachloroethane and having less than 3 mole percent of aliphatic to aromatic oxygen linkages, the copolyester comprised of the following divalent radicals:

(A)

(B)

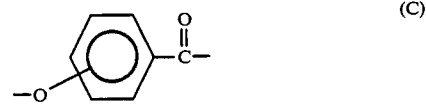

(C)

wherein $R_1$ is a divalent aromatic radical having 6 to 16 carbon atoms with the carbonyl linkages separated by at least 3 carbon atoms;
at least 90 mole percent of radical (C) is the para isomer; and
the range of radical (C) is 30 to 70 mole percent based on the total moles of (A) and (C) combined.

5. An article strapped according to the method of claim 1.

6. A plurality of articles strapped according to the method of claim 3.